United States Patent [19]

Cheng et al.

[11] Patent Number: 5,963,155
[45] Date of Patent: Oct. 5, 1999

[54] SYSTEM AND METHOD OF TRANSFORMING INFORMATION BETWEEN UCS AND EBCDIC REPRESENTATIONS EMPLOYING EBCDIC-FRIENDLY TRANSFORMATION FORMATS

[75] Inventors: Chun-Yao Alexis Cheng, Scarborough; Ibrahim Ismail Meru, Don Mills; Claude Richard Pond, Toronto; Baldev Singh Soor, Markham; Vettakkorumakankavu Sitaram Umamaheswaran, Ajax, all of Canada

[73] Assignee: International Business Machines Corporation, Armonk, N.Y.

[21] Appl. No.: 08/968,219

[22] Filed: Nov. 12, 1997

[30] Foreign Application Priority Data

May 16, 1997 [CA] Canada ................................. 2205641

[51] Int. Cl.[6] .................................................. H03M 7/00
[52] U.S. Cl. ............................................... 341/90; 341/95
[58] Field of Search .................................. 341/67, 90, 95

[56] References Cited

U.S. PATENT DOCUMENTS

| | | | |
|---|---|---|---|
| 4,597,057 | 6/1986 | Snow | 364/900 |
| 5,225,833 | 7/1993 | Fisher et al. | 341/90 |
| 5,381,144 | 1/1995 | Wilson et al. | 341/63 |
| 5,444,445 | 8/1995 | Chu | 341/87 |
| 5,682,158 | 10/1997 | Edberg et al. | 341/90 |

*Primary Examiner*—Marc S. Hoff
*Attorney, Agent, or Firm*—Scully, Scott, Murphy & Presser; Jay P. Sbrollini

[57] ABSTRACT

A system and method of transforming information between UCS and EBCDIC-friendly representations comprises a two-stage transformation process using a first stage which transforms a UCS string to and from an intermediate form string, referred to as an I8-string. A second stage transforms the I8-string to and from a string in an EBCDIC-friendly representation. The two stages employ transformations which result in control characters and other selected characters being represented as single octets in the I8 and EBCDIC-friendly strings and the transformations are symmetric in both stages. The second stage can produce EBCDIC-friendly strings in one or more selected EBCDIC encodings.

32 Claims, 1 Drawing Sheet

SYSTEM AND METHOD OF TRANSFORMING INFORMATION BETWEEN UCS AND EBCDIC REPRESENTATIONS EMPLOYING EBCDIC-FRIENDLY TRANSFORMATION FORMATS

FIELD OF THE INVENTION

The present invention relates to a system and method of transforming information between different representations. More particularly, the present invention relates to the transformation of information represented in ISO/IEC 10646-1 (UCS) or Unicode encodings to and/or from EBCDIC-friendly representations.

BACKGROUND OF THE INVENTION

With the exponential growth of the internet and computer networks in general, it has become increasingly important that the computers connected by these networks, and their operating systems, be able to work with information represented in a variety of character sets. For example, in North America the majority of computer systems represent information in Latin characters, while in Russia information is primarily represented in Cyrillic characters and in Japan information is often represented in Katakana characters.

Within computer systems and networks, characters are represented by values assigned to characters, the specific assignments being defined within a coded character set. A common encoding scheme is ASCII which, for example, specifies that the value 97 (hexadecimal 0x61) represents the lower case "a" character, the value 65 (0x41) represents an upper case "A" character, etc. Another common encoding scheme is EBCDIC which, for example, specifies that the value 129 (hexadecimal 0x81) represents the lower case "a" character and the value 193 (hexadecimal 0xC1) represents the uppercase "A" character.

While different character sets exist in both of these encoding schemes, other encoding schemes are employed in a variety of other countries and/or languages. Accordingly, using information represented in a different coded character set, or changing the representation of information from one coded character set to another, is often required but can be difficult to accomplish. In particular, ASCII and EBCDIC encoded character sets are single octet (byte) systems and thus can only encode a maximum of 256 characters, including all control characters, etc. When it is desired to encode a larger set of characters, a multi-octet encoding scheme is required.

In an attempt to define a universal method of representing characters which allows all, or substantially all, desired characters to be represented, the International Standards Organization (ISO/IEC) has published the Universal Multiple Octet Coded Character Set (UCS) as standard ISO/IEC 10646-1, and it's amendments. UCS can define over two billion characters and UCS includes a two-byte (UCS-2) form and a four-byte (UCS-4) form and these forms and the UCS standard are described in ISO/IEC 10646-1: 1993—Universal Multiple-Octet Coded Character Set and in the corresponding Unicode Standard V2.0, from the Unicode Consortium which employs the UCS-2 form of UCS, and the contents of these publications are incorporated by reference herein.

While UCS provides a reasonable framework within which to handle large numbers of characters, many pre-UCS computer systems and pre-UCS information/data employs other character sets and it is necessary to transform information represented in UCS to a form compatible with these other character sets, or vice versa. In particular, information represented in UCS cannot be directly processed by systems using ASCII encoding or EBCDIC encoding, therefore transformation to and from UCS is required. Due to the widespread use of ASCII (7 bit, 128 characters), it was particularly desired to have a transform for UCS to ASCII and back.

A transform referred to as UTF-8 has been developed to transform UCS-2 to and from ASCII. This transform is defined in Amendment No. 2 to ISO/IEC 10646-1 and the contents of this publication are incorporated herein by reference. UTF-8 transforms UCS-2 information to an ASCII-friendly format and vice-versa and maintains the ASCII characters (assigned to values 0 through 127) as single octets and the rest of the UCS-2 character set as sequences of two to six octets (a multi-octet sequence). In particular, the 95 characters and the SPACE, commonly referred to as the graphic characters of the ASCII set, or the G0 set and the 33 control characters (the 32 control characters from 0x00 to 0x1F, referred to as the C0 set, and the DELETE character at 0x7F) are maintained as single octets.

International ISO/IEC 4873 standard defines an 8-bit encoding standard, which defines the structure for other ISO/IEC 8-bit characters sets, such as ISO/IEC 8859-1 (Latin Alphabet No. 1), referred to herein as ISO-8 bit encoding, which employs the same assignment of ASCII characters to values 0x00 through 0x7F but which also includes additional characters. In particular, ISO/IEC 4873 also includes a second set of control characters from 0x80 to 0x9F, referred to as the C1 set and these latter control characters are mirrored as two-octet escape sequences, i.e.—ESC xx, where 'xx' is a suitable value. The UTF-8 transform does not maintain the C1 set as single-octet characters.

It should be emphasised that UTF-8 transforms information between UCS and ASCII-friendly representations, not ASCII representations. In particular, UTF-8 transforms UCS to an ASCII-friendly form wherein the characters assigned to the first 128 values of the ASCII character set are maintained as single octet strings, but all other characters are represented as variable-length multiple-octet strings of between two and six octets.

While UTF-8 is generally useful in many circumstances, it is not useful to transform information represented in UCS to an EBCDIC representation and/or vice versa. Unlike ASCII, EBCDIC includes 65 control codes, in addition to the 191 letter, number and punctuation characters (generally referred to as 'graphic characters'). The graphics characters are located at 64 (0x40), for the SPACE character, and from 65 (0x41) to 254 (0xFE) and the control characters are assigned from 0x00 to 0x40 and the EO ("eight ones") character which is assigned to 0xFF.

Thus, for compatibility with computer systems using and/or information represented in EBCDIC, information transformed between UCS and EBCDIC-friendly forms must ensure that the 65 control characters be transformed to single-octet representations.

Further, despite the fact that there exist many EBCDIC coded character sets (commonly referred to as "code pages"), a subset of these characters, which is often referred to as the "invariant" character set, is assigned to common values in most or all code pages. For example, the upper case Latin characters "A" through "Z" appear at values 193 (0xC1) to 233 (0xE9) in all EBCDIC code pages. Similarly, the numerals "0" through "9" appear at values 240 (0xF0) through 249 (0xF9) in all EBCDIC code pages. While there are some exceptions to these invariant assignments, as discussed below in more detail, it is desired that a transform maintain the single-octet values to which the invariant character set is assigned.

SUMMARY OF THE INVENTION

It is an object of the present invention to provide a system and method for transforming information between UCS and EBCDIC-friendly representations. It is another object of the present invention to provide a system and method for transforming information between UCS and ISO-8 bit-friendly representations.

According to a first aspect of the present invention, there is provided a method of transforming information from a fixed-length multiple-octet representation to a target variable-length multiple-octet representation, the transformation ensuring that a selected set of characters are represented by single octets in said target representation, comprising the steps of:

(i) receiving an input character string in said fixed-length representation and transforming said input character string to a variable-length multiple-octet intermediate representation, said transformation producing a single octet representation in said intermediate representation for a pre-selected set of input characters in said fixed-length representation;

(ii) receiving a character string in said intermediate representation and transforming said character string to an equivalent number of octets in said target representation, said transformation maintaining characters represented by single octets in said intermediate representation as characters represented as single octets in said target second representation.

According to a second aspect of the present invention, there is provided a method of transforming information from a variable-length multiple-octet representation to a fixed-length multiple-octet representation, comprising the steps of:

(i) receiving an input character string in said variable-length representation and transforming said input character string to the same number of octets in a variable-length multiple-octet intermediate representation; and (ii) examining said character string which has been transformed to said intermediate representation to determine the number of octets representing each character and transforming each character represented by said determined number of octets to a corresponding value in said fixed-length multiple octet representation.

According to another aspect of the present invention, there is provided a method of transforming information from a fixed-length multiple-octet representation to a variable-length multiple-octet representation by receiving an input character string in said fixed-length representation and transforming said input character string to said variable-length multiple-octet representation, said transformation producing a single octet representation in said variable-length representation for a pre-selected set of input characters in said fixed-length representation.

According to yet another aspect of the present invention, there is provided a system for transforming information between a fixed-length multiple-octet representation and a variable-length multiple-octet representation, comprising:

a first transform stage to transform information between said fixed-length multiple-octet representation and an intermediate variable-length multiple-octet representation, said first transform stage including a pre-defined set of characters which are represented as single octet values in said intermediate variable-length multiple octet representation; and a second transform stage to transform information between said intermediate representation and said variable-length multiple-octet representation, said second transform stage including means to maintain characters represented as single octets in either of said intermediate representation and said variable-length multiple-octet representation as single octets in the other of said intermediate representation and said variable-length multiple-octet representation.

Preferably, the fixed-length multiple-octet representation is UCS-2, UCS-4 or the like. Also preferably, the variable-length multiple-octet intermediate representation is ISO-8 bit-friendly. Also preferably, the variable-length multiple-octet representation is EBCDIC-friendly.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
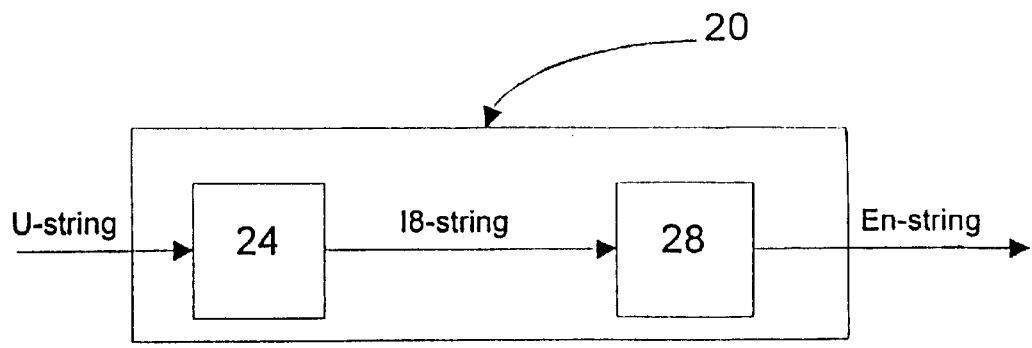
FIG. 1 shows a block diagram of an embodiment of the present invention functioning as a UCS to EBCDIC transformation system and method.
Figure 2:
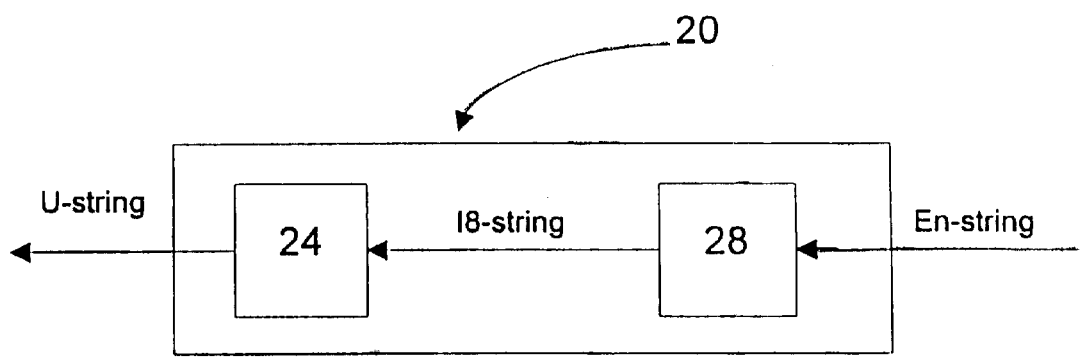
FIG. 2 shows a block diagram of the embodiment of FIG. 1 functioning as an EBCDIC to UCS transformation system and method.

An embodiment of the present invention which is useful for transforming information between UCS representations and EBCDIC-friendly representations is indicated generally at 20 in FIG. 1. As shown in the Figure, in a presently preferred embodiment of the invention the transformation is performed to two stages. A first stage 24 converts an input, referred to herein as a U-string (UCS-2 or UCS-4), to an intermediate form, referred to herein as an I8-string, and a second stage 28 converts the I8-string to an EBCDIC-friendly output, referred to herein as an En-string. FIG. 2 shows this embodiment 20 of the present invention functioning to transform information in an EBCDIC representation (En-string or EBCDIC) to a UCS representation.

As used herein, the term U-string is intended to comprise both UCS-4 (four octet values from 0 to 2,147,483,647 (0x7FFFFFFF)) and UCS-2 (two octet values from 0 to 65,535 (0xFFFF)) and UCS-2 with S-zones, (two pairs of octets). Each character in a U-string is represented as a fixed, multi-octet value, either four octets for UCS-4 or two octets for UCS-2 or two pairs of octets for UCS-2 with S-zones. As is known, the arrangement of UCS-4 is often discussed in terms of groups (indicated by the most significant octet of the four octets), planes (indicated by the next most significant octet) and row and column elements (indicated by the two least significant pair of octets). UCS-2 is discussed in terms of Row and Column elements and UCS-2 with S-zones is discussed in terms of High and Low pairs. Amendment 1 of ISO/IEC Standard 10646 and V2.0 of the Unicode standard discuss the UTF-16 transform whereby the High and Low pairs can be transformed to a UCS-4 representation of row and column elements in group 0, planes 1 through 16, as discussed below.

The Basic Multilingual Plane, or BMP, is 65,536 elements in group 0, plane 0 of UCS-4 (i.e. 0x00000000 to 0x0000FFFF) and most of the world's widely used characters have been allocated positions in the BMP. In a roadmap document adopted by ISO/IEC JTC1/SC2/WG2 and the Unicode Technical Committee, it is shown that in practice all anticipated characters can be represented in the combination of the BMP and the next two planes in group 0 (i.e. 0x00000000 to 0x0002FFFF).

UCS-2 is a subset of UCS-4 and its two octets represent the row and column elements of the BMP. UCS-2 with S-zones comprises, in addition to the BMP, planes 1 through 16 of group 0. As presently implemented, first stage 24 can process a U-string comprising UCS-4, UCS-2 or UCS-2 with S-Zones representations. In the event that invalid S-Zone pairs are detected, first stage 24 will process each pair of octets as a single value in the range 0x4000 to 0xFFFF.

The output of first stage 24 is an intermediate representation referred to herein as an I8-string. The I8-string is a variable length multi-octet sequence which can comprise 1 to 7 octets and is an ISO-8 bit-friendly format. As used herein, the term "friendly format" is intended to comprise any format whereby a multi-octet string has been arranged to represent a selected set of values as single octet values. Specifically, in I8-strings the first 127 characters (including the C0 set) of the ASCII character set and the C1 set of control characters, from the ISO-8 bit encoding scheme, are preserved as single octet values and other characters are represented as 2 to 7 octet values. Thus, processing of I8-strings by ASCII and/or ISO-8 bit systems is simplified and the format is ISO-8 bit-friendly.

For all I8-strings of two or more octets, the total number of octets in the string is indicated in the leading octet of the string by the number of high order bits followed by a zero. For example, b110xxxxx (where 'x' represents a '1' or a '0' and the leading 'b' indicates a binary representation) indicates that the I8-string has two octets and b11111110 indicates that the I8-string has seven octets. Each trailing octet after the leading octet begins with the bit sequence b101xxxxx. Thus, for example, a two octet I8-string might be b110xxxxx b101xxxxx. It should be noted that one exception exists to this in that the lead octet of a seven octet I8-string can be all 1's (i.e—0xFF) when the most significant bit of the corresponding U-string is a 1.

First stage 24 transforms a U-string input, in a specified format, to an I8-string output according to the table shown in Appendix A, for UCS-2, and according to the table shown in Appendix B for UCS-2 with the S-zone. The table shown in Appendix C is used for UCS-4. In the tables, the first two columns represent the lower and upper values of the U-string to which the table row applies, and these values are represented as 16 bit values in UCS-2 and 32 bit values in UCS-4, and the next column represents the number of octets in the corresponding I8-string. The next column in the table represents the number of bits from the U-string that are contained in the I8-string in the form M(n), where M represents the maximum number of bits that can be carried in the given number of octets assigned to the I8-string and (n) represents the number of bits which are varied to indicate the value within the From/To range for that table row. The next column shows the permitted values for the octet sequence for the I8-string, in binary form, with the lowest and greatest values shown, along with the bit pattern of the permitted values. The next column shows the lowest and greatest permitted octet sequence values in hexadecimal form and these correspond to the transformed values of the From and the To values in the first two columns.

Transformation from an I8-string back to a valid UCS string (UCS-2 or UCS-4) is accomplished by concatenating the values of the x bits shown in the appropriate table row, stripping off the leading 1's and 0's of each octet, and padding the resulting concatenated string with leading 0's to obtain a final UCS string of the desired two octet or four octet form.

As mentioned above, one exception to the conversion of I8-strings to U-strings exists in that, for I8-strings of seven octets wherein the lead byte has no zeros (0x40000000 to 0x7FFFFFFF), the least significant bit of the leading octet is maintained as the most significant bit of the U-string.

In UTF-8, for circumstances wherein it is possible to encode a value in two or more ways, the "shortest" possible encoded value is defined to be the correct value. This "shortest string rule" is also employed in the presently preferred embodiment of the invention.

The table in Appendix D shows the form of I8-string octets from the U-strings transformed by stage 24. In contrast, the table in Appendix E shows the form of I8-string octets from U-strings transformed by a prior art UTF-8 transform.

As will be apparent to those of skill in the art, first stage 24 transform data between fixed-length multi-octet (UCS-4 or UCS-2) formats and a multi-octet format of from one to seven octets. The transformation employed ensures that a selected set of characters are transformed to single octet values corresponding to ASCII/ISO-8 bit character set assignments, as defined in ISO/IEC 4873. It should be noted that the EBCDIC control set is not identical to the C0 and C1 sets of ISO/IEC 4873, but the number of control characters is the same (i.e. –65). A default correspondence, as defined in IBM's Character Data Representation Architecture (CDRA), as published by IBM, is maintained in a presently preferred embodiment of the present invention.

As will be apparent to those of skill in the art, while the I8-string is an intermediate representation in the transformation between UCS and EBCDIC-friendly representations, it is contemplated that I8-strings can also be directly employed in ASCII/ISO-8 bit-based systems. In such a circumstance, the present invention will transform information between UCS and the I8, ASCII/ISO-8 bit-friendly, format.

The output of second stage 28 of system 20 in FIG. 1 is referred to herein as an En-string, wherein the "E" refers to EBCDIC and the "n" refers to one of one or more predefined EBCDIC code pages. Like many other character representation systems, EBCDIC has different character assignments for use with various languages, and/or in various countries, etc. and these different character assignments are generally referred to as code pages. For example, EBCDIC code page 1047 (commonly referred to as the "EBCDIC Open Systems" code page) has different assignments and/or characters than does EBCDIC code page 37 (commonly referred to as the "US/Canada CECP" code page). In a preferred aspect of the present invention, a set of values can be defined for "n" which correspond to various EBCDIC code pages. For example, n=1 can be defined to identify code page 1047, n=2 can identify code page 500 (International #5), n=3 can identify code page 37, etc. Thus, stage 28 can perform a transformation between I8-strings and E1-strings, or E2-strings, etc.

Each En-string is a multi-octet transformed representation of the I8-string, and thus the U-string. In a presently preferred embodiment of the present invention, the actual conversion of I8-strings to an En-string is performed by table look up which has a unique one to one mapping between I8-string octets and En-string octets and which is symmetric, i.e.—when an I8-string is converted to an En-string and then converted back to an I8-string, the result is identical to the original I8-string. Thus, the transformation is performed in an octet by octet manner.

A character preservation principle is employed for the graphic characters of the I8-string (octet values in the range 0x00 to 0x9F), while an octet preservation principle is employed for the range 0xA0 to 0xFF. Specifically, the transformation employed in stage 28 preserves the single octet representation of all EBCDIC control characters by assigning I8-string octets in the ranges of 0x0 to 0x1F and 0x80 to 0x9F, and character 0x7F to EBCDIC octets in the range of 0x00 to 0x3F and to 0xFF. The transform also preserves the single octet representation for the set of 95 graphic characters (including the SPACE character) of the ASCII/ISO-8 bit character set at their allocated positions in the target EBCDIC code page (indicated by the selected value of 'n') and preserves the leading octets and trailing octets from the I8-string as their corresponding single octets in the En-string. Finally, the transform maintains the symmetry between the forward and reverse pairings. As the transform maintains the single octet representation of EBCDIC control characters and graphics characters, En-strings are EBCDIC-friendly.

The ease with which a determination can be made in stage 28 of whether a sequence is a single octet or multi-octet or whether an octet is a leading or trailing octet is dependent upon the target EBCDIC code page. The technique which is presently preferred is to use a reverse vector look-up to locate the I8-string and then determine the resultant octet using the I8-string rules by consulting a table, such as that shown in Appendix D. As an alternative, a shadow vector containing the category of each octet in the En-string can be constructed and employed.

As presently implemented, five target EBCDIC code page alternatives are available, although more can be implemented if desired. Specifically: n=1 corresponds to code page 1047, "EBCDIC Open Systems (Latin-1)"; n=2 corresponds to code page 500, "EBCDIC multi-lingual CECP (Latin-1)"; n=3 corresponds to code page 37, "EBCDIC US CECP (Latin-1)"; n=4 corresponds to a special alternative, described below; and n=5 corresponds to code page 290, "EBCDIC Katakana Extended". Complete definitions of the above-mentioned code pages are available from a variety of sources and will thus not be described further herein.

The differences for n=1, n=2 and n=3 are due to the mapping of a few variant characters, and these differences are listed in the table of Appendix F. In the table, GCGID refers to an ID defined for the glyph.

Table 1 in Appendix G shows a table for converting between single octet I8-strings and single octet E1-strings (code page 1047) and table 2 shows the categories of octets in E1-strings. Table 3 in Appendix G shows a table for converting between single octet I8-strings and single octet E2-strings (code page 500) and table 4 shows the categories of octets in E2-strings. Table 5 in Appendix G shows a table for converting between single octet I8-strings and single octet E3-strings (code page 37) and table 6 shows the categories of octets in E3-strings. As will be apparent to those of skill in the art, to transform an I8-string to an E1, E2 or E3-string, a reverse transform-vector lookup is employed and range checks (using the table in Appendix F, for example) are performed to determine if the I8-string is a single octet, leading octet or trailing octet, and how many octets are in the string if it is a multi-octet string. Single octet conversions are then performed using the appropriate ones of tables 1 through 6 of Appendix G.

In UCS, the values 0xFFFE and 0xFFFF are not used for character allocation in any plane. Specifically, 0xFFFE is reserved for use as a Signature and 0xFFFF is used to represent a numeric value that is guaranteed not to be a character. 0xFFFF is often used for purposes such as indicated the end of an index of characters, etc. While UTF-8 avoids the use of 0xFE and 0xFF in it's octets, the I8-strings produced by stage 24 and En-strings produced by stage 28 do use the 0xFE and 0xFF values. Specifically, in the I8-string, 0xFE and 0xFF are lead octets of seven-octet I8-strings but they are surrounded by a value less than 0xC0. Thus, neither 0xFFFF or 0xFFFE sequences are valid in properly formed I8-strings. Depending upon the target code page selected, the I8-string to En-string pairings are 0xFE to 0x8E or 0x4A and 0xFF to 0xDF or 0xE1.

In the En-string, the values 0xFE and 0xFF are generated by converting I8-string values according the appropriate conversion table (depending upon the target code page). The I8-string to En-string pairings are 0xDA or 0xBF to 0xFE and 0x9F to 0xFF. 0xBF is the last element of the set of trailing octets possible in a multi-octet I8-string and must be preceded by a lead octet and zero or more trailing octets (all within the range of 0xA0 to 0xFF). An 0x9F cannot precede an 0xBF in a properly formed I8-string, and thus the sequence 0xFFFE cannot appear in an En-string. 0x9F is associated with a control character, specifically the "Application Program Command (APC)" character in ISO-8, C1. According to ISO/IEC 6429, APC is followed by a parameter string using values from 0x8 to 0x0D and from 0x20 to 0x7E and is terminated by the control function "String Terminator (ST)" which is associated with value 0x9C in ISO-8, C1. Thus, the sequence 0xFFFF (which would be equivalent to two APC characters without intervening parameters or ST characters) cannot appear in an En-string.

In the presently preferred embodiment of the invention, n=4 (i.e. E4-strings) have been reserved for special use. Specifically, when a table lookup method is employed in the transform of stage 28, the different octets of the E1, E2 or E3-string are not well grouped for checking. In the arrangement provided with n=4, a single octet to single octet vector lookup is employed such that octets of E4-strings can be examined directly. Table 1 of Appendix H shows the groupings for E4-strings and table 2 shows the distribution of octets from single octet E4-strings and table 3 shows the categories of the octets in E4-strings. Table 4 shows a table for converting between single octet I8-strings and single octet E4-strings. As shown, E4-strings employ the E1 mappings as a base for mapping single octets in the range 0x00–0x9F from the I8-string and the remaining space is allocated to group leading and trailing octets in contiguous ranges, where possible. Of course, the distribution of single octets is such that it is not always possible to keep each category in a contiguous range.

As will be apparent to those of skill in the art, if a different base than E1is selected for mapping single octets, the distribution of octets of the variant category will also change as will the distribution of the remaining octets.

As mentioned above, some few EBCDIC code pages do not maintain the mapping of the invariant character set. A widely used code page in which some of the characters in the invariant character set are assigned to different values is code page 290, commonly referred to as Katakana Extended. In this code page, the lower case Latin characters ("a" to "z") are not assigned to the ranges used in most other code pages, i.e.—0x81 to 0x89, 0x91 to 0x99 and 0xA2 to 0A9. Accordingly, the transformation to and/or from E5-strings has been designed to accommodate the different assignments of the "invariant" character set employed in code page 290. As will be apparent to those of skill in the art, additional special transformations and E-string definitions can be created, if required, for other code pages in which characters of the invariant character set have a variant assignment.

Table 1 in Appendix I shows a table of the groupings of E5-string octets and table 2 shows a table for converting between single octet I8-strings and single octet E5-strings (code page 290). Table 3 shows the categories of octets in E5-strings.

The present invention provides a novel system and method of allowing information and/or systems using one or more EBCDIC code pages to represent information to transparently access UCS-coded information and/or systems. The first stage of the invention transforms information between fixed-length multiple-octet representations, such as UCS-2 or UCS-4, and a variable-length multiple-octet representation wherein the representation of a selected set of characters as single octets is ensured. The second stage of the invention transforms information from a variable-length multiple-octet representation to another variable-length multiple-octet representation. The transformation is performed on an octet by octet basis, and thus the number of octets representing a character in the output of the transform is the same as the number of octets representing the character in the input of the transform. The transform thus preserves single-octet characters as single octets through the transformation. Further, the transform can assign a selected set of invariant or other characters to selected values. While the above discussion concentrates on transformation between UCS and EBCDIC-friendly representations, the present invention is not so limited and can be employed to transform information between UCS and other variable-length multiple-octet representations. Similarly, the present invention can be employed to transform information between other fixed-length multiple-octet representations and variable-length multiple-octet representations.

The above-described embodiments of the invention are intended to be examples of the present invention and alterations and modifications may be effected thereto, by those of skill in the art, without departing from the scope of the invention which is defined solely by the claims appended hereto.

APPENDIX A

| U-string, UCS-2 Form | | | | I8-string | |
|---|---|---|---|---|---|
| From | To | # of | # of | Octet Sequence | |
| (Hex) | (Hex) | Octets | Bits | bits (x = 0 or 1) | Hex |
| 00 | 1F | 1 | 8 | 00000000 | 00 |
|  | (C0 set) |  | (5) | ≦000xxxxx |  |
|  |  |  |  | ≦00011111 | ≦1F |
| 20 | 7F | 1 | 8 | 00100000 | 20 |
|  | (G0 set + |  | (7) | ≦0xxxxxxx |  |
|  | DEL) |  |  | ≦01111111 | ≦7F |
| 80 | 9F | 1 | 8 | 10000000 | 80 |
|  | (C1 set) |  | (5) | ≦100xxxxx |  |
|  |  |  |  | ≦10011111 | ≦9F |
| A0 | 3FF | 2 | 10 | 11000101 10100000 | C5 A0 |
|  |  |  | (10) | ≦110xxxxx 101xxxxx |  |
|  |  |  |  | ≦11011111 10111111 | ≦DF BF |
| 400 | 3FFF | 3 | 14 | 11100001 10100000 10100000 | E1 A0 A0 |
|  |  |  | (14) | ≦1110xxxx 101xxxxx 101xxxxx |  |
|  |  |  |  | ≦11101111 10111111 10111111 | ≦EF BF BF |
| 4000 | FFFF | 4 | 18 | 11110000 10110000 10100000 10100000 | F0 B0 A0 A0 |
|  | (BMP |  | (16) | ≦1111000x 101xxxxx 101xxxxx 101xxxxx |  |
|  | Limit) |  |  | ≦11110001 10111111 10111111 10111111 | ≦F1 BF BF BF |

APPENDIX B

| U-string, UCS-2 Form Including S-Zones | | | | I8-string | |
|---|---|---|---|---|---|
| From | To | # of | # of | Octet Sequence | |
| (Hex) | (Hex) | Octets | Bits | bits (x = 0 or 1) | Hex |
| 4000 | D7FF | 4 | 18 | 11110000 10110000 10100000 10100000 | F0 B0 A0 A0 |
|  |  |  | (16) | ≦1111000x 101xxxxx 101xxxxx 101xxxxx |  |
|  |  |  |  | ≦11110001 10110101 10111111 10111111 | ≦F1 B5 BF BF |

Note: Valid pairs (HI,LO) of S-Zone RC-elements - used to transform planes 1 to 3 in UTF-16, are shown below

| HI = D800 | HI = D8BF | 4 | 18 | 11110010 10100000 10100000 10100000 | F2 A0 A0 A0 |
| + | + |  | (18) | ≦11110xxx 101xxxxx 101xxxxx 101xxxxx |  |
| LO = DC00 | LO = DFFF |  |  | ≦11110111 10111111 10111111 10111111 | ≦F7 BF BF BF |
| (= 10000) | (= 3FFFF) |  |  |  |  |

APPENDIX B-continued

| U-string, UCS-2 Form Including S-Zones | | | | 18-string | |
|---|---|---|---|---|---|
| From | To | # of | # of | Octet Sequence | |
| (Hex) | (Hex) | Octets | Bits | bits (x = 0 or 1) | Hex |

Note: HI S-Zone RC-elements that are used for planes 1 to 3 in UTF-16, but are not part of valid (HI,LO) pairs follow

| | | | | | |
|---|---|---|---|---|---|
| D800 | D8BF | 4 | 18 | 11110001 10110110 10100000 10100000 | F1 B6 A6 A0 |
| | S-Zone HI | | (16) | ≦1111000x 101xxxxx 101xxxxx 101xxxxx | |
| | (For 1st three planes) | | | ≦11110001 10110110 10100101 10111111 | ≦F1 B6 BF BF |

Note: Valid pairs of (HI,LO) S-Zone RC-elements - used for planes 4 to 16 in UTF-16, are shown below

| | | | | | |
|---|---|---|---|---|---|
| HI = D8C0 | HI = DBFF | 5 | 22 | 11111000 10101000 10100000 10100000 | F8 A8 A0 A0 |
| + | + | | (21) | 10100000 | A0 |
| LO = DC00 | LO = DFFF | | | ≦1111100x 101xxxxx 101xxxxx 101xxxxx | |
| (= 40000) | (= 10FFFF) | | | 101xxxxx | ≦F9 A1 BF BF |
| | | | | ≦11111001 10100001 10111111 10111111 10111111 | BF |

Note: HI S-Zone RC-elements that are used for planes 4 to 16 in UTF-16, but are not part of valid (HI,LO) pairs follow

| | | | | | |
|---|---|---|---|---|---|
| D8C0 | DBFF | 4 | 18 | 11110001 10110110 10100110 10100000 | F1 B6 A6 A0 |
| | S-Zone HI | | (16) | ≦1111000x 101xxxxx 101xxxxx 101xxxxx | |
| | (for planes 4 to 16) | | | ≦11110001 10110110 10111111 10111111 | ≦F1 B6 BF BF |

Note: LO S-Zone RC-elements that are not part of a valid (HI,LO) pair follow

| | | | | | |
|---|---|---|---|---|---|
| DC00 | DFFF | 4 | 18 | 11110001 10110111 10100000 10100000 | F1 B7 A0 A0 |
| | S-Zone LO | | (16) | ≦1111000x 101xxxxx 101xxxxx 101xxxxx | |
| | (for planes 1 to 16) | | | ≦11110001 10110111 10111111 10111111 | ≦F1 B7 BF BF |
| E000 | FFFF | 4 | 18 | 11110001 10111000 10100000 10100000 | F1 B8 A0 A0 |
| | | | (16) | ≦1111000x 101xxxxx 101xxxxx 101xxxxx | |
| | | | | ≦11110111 10111111 10111111 10111111 | ≦F1 BF BF BF |

APPENDIX C

| U-string, UCS-4 Form Including S-Zones | | | | 18-string | |
|---|---|---|---|---|---|
| From | To | # of | # of | Octet Sequence | |
| (Hex) | (Hex) | Octets | Bits | bits (x = 0 or 1) | Hex |
| 00 | 1F | 1 | 8 | 00000000 | 00 |
| | (C0 set) | | (5) | ≦000xxxxx | |
| | | | | ≦00011111 | ≦1F |
| 20 | 7F | 1 | 8 | 00100000 | 20 |
| | (G0 set + DEL) | | (7) | ≦0xxxxxxx | |
| | | | | ≦01111111 | ≦7F |
| 80 | 9F | 1 | 8 | 10000000 | 80 |
| | (C1 set) | | (5) | ≦100xxxxx | |
| | | | | ≦10011111 | ≦9F |
| A0 | 3FF | 2 | 10 | 11000101 10100000 | C5 A0 |
| | | | (10) | ≦110xxxxx 101xxxxx | |
| | | | | ≦11011111 10111111 | ≦DF BF |
| 400 | 3FFF | 3 | 14 | 11100001 10100000 10100000 | E1 A0 A0 |
| | | | (14) | ≦1110xxxx 101xxxxx 101xxxxx | ≦EF BF |
| | | | | ≦11101111 10111111 10111111 | BF |
| 4000 | FFFF | 4 | 18 | 11110000 10110000 10100000 10100000 | F0 B0 A0 |
| | (BMP Limit) | | (16) | ≦1111000x 101xxxxx 101xxxxx 101xxxxx | A0 |
| | | | | ≦11110001 10111111 10111111 10111111 | ≦F1 BF BF BF |
| 10000 | 3FFFF | 4 | 18 | 11110010 10100000 10100000 10100000 | F2 A0 A0 |
| | (Planes 1 to 3) | | (18) | ≦11110xxx 101xxxxx 101xxxxx 101xxxxx | A0 |
| | | | | ≦11110111 10111111 10111111 10111111 | ≦F7 BF BF BF |
| 40000 | 10FFFF | 5 | 22 | 11111000 10101000 10100000 10100000 10100000 | F8 A8 A0 |
| | (Planes 4 to 16) | | (21) | ≦1111100x 101xxxxx 101xxxxx 101xxxxx 101xxxxx | A0 A0 |
| | | | | ≦11111001 10100001 10111111 10111111 10111111 | ≦F9 A1 BF BF BF |
| 110000 | 3FFFFF | 5 | 22 | 11111001 10100010 10100000 10100000 10100000 | F9 A2 A0 |
| | | | (22) | ≦111110xx 101xxxxx 101xxxxx 101xxxxx 101xxxxx | A0 A0 |
| | | | | ≦11111011 10111111 10111111 10111111 10111111 | ≦FB BF |

APPENDIX C-continued

| U-string, UCS-4 Form Including S-Zones | | 18-string | | | |
|---|---|---|---|---|---|
| From (Hex) | To (Hex) | # of Octets | # of Bits | Octet Sequence bits (x = 0 or 1) | Hex |
| 400000 | 3FFFFFF | 6 | 26 (26) | 11111100 10100100 10100000 10100000 10100000 10100000<br>≤1111110x 101xxxxx 101xxxxx 101xxxxx 101xxxxx 101xxxxx<br>≤11111101 10111111 10111111 10111111 10111111 10111111 | BF BF BF<br>FC A4 A0<br>A0 A0 A0<br>≤FD BF<br>BF BF BF<br>BF |
| 4000000 | 3FFFFFFF | 7 | 30 (30) | 11111110 10100010 10100000 10100000 10100000 10100000 10100000<br>≤11111110 101xxxxx 101xxxxx 101xxxxx 101xxxxx 101xxxxx 101xxxxx<br>≤11111110 10111111 10111111 10111111 10111111 10111111 10111111 | FE A2 A0<br>A0 A0 A0<br>A0<br>≤FE BF<br>BF BF BF<br>BF BF |
| 40000000 | 7FFFFFFF | 7 (special lead byte) | 31 (31) | 11111111 10100000 10100000 10100000 10100000 10100000 10100000<br>≤11111111 101xxxxx 101xxxxx 101xxxxx 101xxxxx 101xxxxx 101xxxxx<br>≤11111111 10111111 10111111 10111111 10111111 10111111 10111111 | FF A0 A0<br>A0 A0 A0<br>A0<br>≤FF BF<br>BF BF BF<br>BF BF |

APPENDIX D

| Hi ↓ | →Low Nibble of 18-string | | | | | | | | | | | | | | | |
|---|---|---|---|---|---|---|---|---|---|---|---|---|---|---|---|---|
| | -0 | -1 | -2 | -3 | -4 | -5 | -6 | -7 | -8 | -9 | -A | -B | -C | -D | -E | -F |
| 0- | | | | | | | C0 Set | | | | | | | | | |
| 1- | | | | | | | (Single Octets) | | | | | | | | | |
| 2- | | | | | | | G0 Set and DEL | | | | | | | | | |
| 3- | | | | | | | (Single Octets) | | | | | | | | | |
| 4- | | | | | | | | | | | | | | | | |
| 5- | | | | | | | | | | | | | | | | |
| 6- | | | | | | | | | | | | | | | | |
| 7- | | | | | | | | | | | | | | | | |
| 8- | | | | | | | C1 Set | | | | | | | | | |
| 9- | | | | | | | (Single Octets) | | | | | | | | | |
| A- | | | | | | | 32 Trailing Octets | | | | | | | | | |
| B- | | | | | | | | | | | | | | | | |
| C- | | | | | | | 32 Lead Octets of 2-Octet Sequence | | | | | | | | | |
| D- | | | | | | | | | | | | | | | | |
| E- | | | | | | | 16 Lead Octets of 3-Octet Sequence | | | | | | | | | |
| F- | 8 Lead Octets of 4-Octet Sequence | | | | | | 4 Lead Octets of 5-Octet Sequence | | | | 2 Lead Octets of 6-Octet Sequence | | | | 2 Lead Octets of 7-Octet Sequence | |

APPENDIX E

| Hi ↓ | →Low Nibble of 18-string | | | | | | | | | | | | | | | |
|---|---|---|---|---|---|---|---|---|---|---|---|---|---|---|---|---|
| | -0 | -1 | -2 | -3 | -4 | -5 | -6 | -7 | -8 | -9 | -A | -B | -C | -D | -E | -F |
| 0- | | | | | | | C0 Set | | | | | | | | | |
| 1- | | | | | | | (Single Octets) | | | | | | | | | |
| 2- | | | | | | | G0 Set and DEL | | | | | | | | | |
| 3- | | | | | | | (Single Octets) | | | | | | | | | |
| 4- | | | | | | | | | | | | | | | | |
| 5- | | | | | | | | | | | | | | | | |
| 6- | | | | | | | | | | | | | | | | |
| 7- | | | | | | | | | | | | | | | | |
| 8- | | | | | | | 64 Trailing Octets | | | | | | | | | |
| 9- | | | | | | | C1 Set is not preserved as Single Octets | | | | | | | | | |
| A- | | | | | | | | | | | | | | | | |
| B- | | | | | | | | | | | | | | | | |
| C- | | | | | | | 32 Lead Octets of 2-Octet Sequence | | | | | | | | | |
| D- | | | | | | | | | | | | | | | | |
| E- | | | | | | | 16 Lead Octets of 3-Octet Sequence | | | | | | | | | |

APPENDIX E-continued

| F- | 8 Lead Octets of 4-Octet Sequence | 4 Lead Octets of 5-Octet Sequence | 2 Lead Octets of 6-Octet Sequence | 2 Unused |
|---|---|---|---|---|

APPENDIX F

| Hex | Glyph | GCGID | UCS Name | 1047 Hex | Var | 500 Hex | =/# | 37 Hex | =/# |
|---|---|---|---|---|---|---|---|---|---|
| 21 | ! | SP02 | Exclamation Mark | 5A | V | 4F | # | 5A | = |
| 5B | [ | SM06 | Left Square Bracket | AD | V | 4A | # | BA | # |
| 5D | ] | SM08 | Right Square Bracket | BD | V | 5A | # | BB | # |
| 5E | ˆ | SD15 | Circumflex Accent | 5F | V | 5F | = | B0 | # |
| 7C | \| | SM13 | Vertical Line | 4F | V | BB | # | 4F | = |
| A2 | ¢ | SC04 | Cent Sign | 4A | V | B0 | # | 4A | = |
| A8 | ¨ | SD17 | Diaresis | BB | V | BD | # | BD | # |
| AC | ¬ | SM66 | Not Sign | B0 | V | BA | # | 5F | # |
| DD | Ý | LY12 | Latin Capital Y with Acute | BA | V | AD | # | AD | # |

Note:
The V in the Var column indicates if the character is not part of GCSGID 640. The '=' in the =/# column indicates the value in the Hex column equals the Hex value of the 1047 code page and a '#' indicates inequality

APPENDIX G

TABLE 1

| Hi ↓ | →Lo Nibble of I8-string | | | | | | | | | | | | | | | |
|---|---|---|---|---|---|---|---|---|---|---|---|---|---|---|---|
| | -0 | -1 | -2 | -3 | -4 | -5 | -6 | -7 | -8 | -9 | -A | -B | -C | -D | -E | -F |
| 0- | 00 | 01 | 02 | 03 | 37 | 2D | 2E | 2F | 16 | 05 | 25 | 0B | 0C | 0D | 0E | 0F |
| 1- | 10 | 11 | 12 | 13 | 3C | 3D | 32 | 26 | 18 | 19 | 3F | 27 | 1C | 1D | 1E | 1F |
| 2- | 40 | 5A | 7F | 78 | 5B | 6C | 50 | 7D | 4D | 5D | 5C | 4E | 6B | 60 | 48 | 61 |
| 3- | F0 | F1 | F2 | F3 | F4 | F5 | F6 | F7 | F8 | F9 | 7A | 5E | 4C | 7E | 6E | 6F |
| 4- | 7C | C1 | C2 | C3 | C4 | C5 | C6 | C7 | C8 | C9 | D1 | D2 | D3 | D4 | D5 | 06 |
| 5- | D7 | D8 | D9 | E2 | E3 | E4 | E5 | E6 | E7 | E8 | E9 | AD | E0 | 80 | 5F | 6D |
| 6- | 79 | 81 | 82 | 83 | 84 | 85 | 86 | 87 | 88 | 89 | 91 | 92 | 93 | 94 | 95 | 96 |
| 7- | 97 | 98 | 99 | A2 | A3 | A4 | A5 | A6 | A7 | A8 | A9 | C0 | 4F | D0 | A1 | 07 |
| 8- | 20 | 21 | 22 | 23 | 24 | 15 | 06 | 17 | 28 | 29 | 2A | 2B | 2C | 09 | 0A | 1B |
| 9- | 30 | 31 | 1A | 33 | 34 | 35 | 36 | 08 | 38 | 39 | 3A | 38 | 84 | 14 | 3E | FF |
| A- | 41 | AA | 4A | 81 | 9F | 82 | 6A | 85 | 88 | B4 | 9A | 8A | B0 | CA | AF | BC |
| B- | 90 | 8F | EA | FA | BE | AD | 86 | 83 | 9D | DA | 98 | 88 | B7 | 88 | 89 | AB |
| C- | 64 | 65 | 62 | 66 | 63 | 67 | 9E | 68 | 74 | 71 | 72 | 73 | 78 | 75 | 76 | 77 |
| D- | AC | 69 | ED | EE | EB | EF | EC | 8F | 80 | FD | FE | FB | FC | BA | AE | 59 |
| E- | 44 | 45 | 42 | 46 | 43 | 47 | 9C | 48 | 54 | 51 | 52 | 53 | 58 | 55 | 56 | 57 |
| F- | 8C | 49 | CD | CE | C8 | CF | CC | E1 | 70 | DD | DE | DB | DC | 8D | 8E | DF |

| Hi ↓ | →Lo Nibble of E1-string | | | | | | | | | | | | | | | |
|---|---|---|---|---|---|---|---|---|---|---|---|---|---|---|---|
| | -0 | -1 | -2 | -3 | -4 | -5 | -6 | -7 | -8 | -9 | -A | -B | -C | -D | -E | -F |
| 0- | 00 | 01 | 02 | 03 | 9C | 09 | 86 | 7F | 97 | 8D | 8E | 0B | 8C | 0D | 0E | 0F |
| 1- | 10 | 11 | 12 | 13 | 9D | 85 | 88 | 87 | 18 | 19 | 92 | 8F | 1C | 1D | 1E | 1F |
| 2- | 80 | 81 | 82 | 83 | 84 | 0A | 17 | 1D | 88 | 89 | 8A | 8B | 8C | 05 | 06 | 07 |
| 3- | 9D | 91 | 16 | 93 | 94 | 95 | 96 | 04 | 98 | 99 | 9A | 98 | 14 | 15 | 9E | 1A |
| 4- | 28 | A0 | E2 | E4 | E0 | E1 | E3 | E5 | E7 | F1 | A2 | 2E | 3C | 28 | 28 | 7C |
| 5- | 26 | E9 | EA | EB | E8 | ED | EE | EF | EC | DF | 21 | 24 | 2A | 29 | 38 | 5E |
| 6- | 2D | 2F | C2 | C4 | C0 | C1 | C3 | C5 | C7 | D1 | A6 | 2C | 25 | 5F | 3E | 3F |
| 7- | F8 | C9 | CA | CB | C8 | CD | CE | CF | CC | 60 | 3A | 23 | 40 | 27 | 3D | 22 |
| 8- | D8 | 61 | 62 | 63 | 64 | 65 | 66 | 67 | 68 | 69 | AB | 88 | F0 | FD | FE | B1 |
| 9- | 80 | 6A | 6B | 6C | 6D | 6E | 6F | 70 | 71 | 72 | AA | BA | E6 | B8 | C6 | A4 |
| A- | 85 | 7E | 73 | 74 | 75 | 76 | 77 | 78 | 79 | 7A | A1 | DF | D0 | 58 | DE | AE |
| D- | AC | A3 | A5 | 87 | A9 | A7 | 86 | 8C | 8D | DE | DD | A8 | AF | 5D | 84 | D7 |
| C- | 78 | 41 | 42 | 43 | 44 | 45 | 46 | 47 | 48 | 49 | AD | F4 | F6 | F2 | F3 | F5 |
| D- | 7D | 4A | 48 | 4C | 1D | 4E | 4F | 50 | 51 | 52 | DY | FB | FC | FY | FA | FF |
| E- | 5C | F7 | 53 | 54 | 55 | 56 | 57 | 58 | 59 | 5A | B2 | D4 | D6 | D2 | D3 | D5 |
| F- | 30 | 31 | 32 | 33 | 34 | 35 | 36 | 37 | 38 | 39 | B3 | DB | DC | D9 | DA | 9F |

TABLE 2

| Hi | →Lo Nibble of E1-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | cc | cc | cc | cc | cc | cc | cc | cc | cc | cc | cc | cc | cc | cc | cc | cc |
| 1- | cc | cc | cc | cc | cc | cc | cc | cc | cc | cc | cc | cc | cc | cc | cc | cc |
| 2- | cc | cc | cc | cc | cc | cc | cc | cc | cc | cc | cc | cc | cc | cc | cc | cc |
| 3- | cc | cc | cc | cc | cc | cc | cc | cc | cc | cc | cc | cc | cc | cc | cc | cc |
| 4- | ii | tt | 33 | 33 | 33 | 33 | 33 | 33 | 33 | 44 | tt | ii | ii | ii | ii | vv |
| 5- | ii | 33 | 33 | 33 | 33 | 33 | 33 | 33 | 33 | 22 | vv | vv | ii | ii | ii | vv |
| 6- | ii | ii | 22 | 22 | 22 | 22 | 22 | 22 | 22 | 22 | tt | ii | ii | ii | ii | ii |
| 7- | 55 | 22 | 22 | 22 | 22 | 22 | 22 | 22 | 22 | vv | ii | vv | vv | ii | ii | ii |
| 8- | 22 | ii | ii | ii | ii | ii | ii | ii | ii | tt | tt | 44 | 66 | 77 | tt |   |
| 9- | tt | ii | ii | ii | ii | ii | ii | ii | ii | tt | tt | 33 | tt | 22 | tt |   |
| A- | tt | vv | ii | ii | ii | ii | ii | ii | ii | tt | tt | 22 | vv | 22 | tt |   |
| B- | tt | tt | tt | tt | tt | tt | tt | tt | tt | 22 | tt | tt | vv | tt | 22 |   |
| C- | vv | ii | ii | ii | ii | ii | ii | ii | ii | tt | 44 | 44 | 44 | 44 | 44 |   |
| D- | vv | ii | ii | ii | ii | ii | ii | ii | ii | tt | 55 | 65 | 55 | 55 | 77 |   |
| E- | vv | 44 | ii | ii | ii | ii | ii | ii | ii | tt | 22 | 22 | 22 | 22 | 22 |   |
| F- | ii | ii | ii | ii | ii | ii | ii | ii | ii | tt | 22 | 22 | 22 | 22 | cc |   |

Legend:
cc = control character; ii = invariant, part of syntactic character set; vv = variant - part of ISO/IEC 646 (IRV) (ASCII) but varies among EBCDIC code page definitions; all cc, ii and vv octets are single octets. tt = trailing octet in a multiple-octet En-string: 22, 33, 44, 55, 66, 77 = First of 2-octet, first of 3-octet, . . . , or first of 7-octet in a multiple-octet En-string.

TABLE 3

| Hi | →Lo Nibble of I8-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | 00 | 01 | 02 | D3 | 37 | 2D | 2E | 2F | 16 | D5 | 25 | DB | 0C | D0 | 0E | DF |
| 1- | 10 | 11 | 12 | 13 | 3C | 30 | 32 | 26 | 18 | 19 | 3F | 27 | 1C | 1D | 1E | 1F |
| 2- | 40 | 4F | 7F | 78 | 58 | 6C | 5D | 7D | 4D | 5D | 5C | 4E | 6B | 60 | 4B | 61 |
| 3- | FD | F1 | F2 | F3 | F4 | F5 | F6 | F7 | F8 | F9 | 7A | 5E | 4C | 7E | 6E | 6F |
| 4- | 7C | C1 | C2 | C3 | C4 | C5 | C6 | C7 | C8 | C9 | D1 | D2 | D3 | D4 | D5 | D6 |
| 5- | 07 | 08 | 09 | E2 | E3 | E4 | E5 | E6 | E7 | E8 | E9 | 4A | E0 | 5A | 5F | 60 |
| 6- | 79 | 81 | 82 | 83 | 84 | 85 | 86 | 87 | 88 | 89 | 91 | 92 | 93 | 94 | 95 | 96 |
| 7- | 97 | 98 | 99 | A2 | A3 | A4 | A5 | A6 | A7 | A8 | A9 | CD | BB | DD | A1 | D7 |
| 8- | 20 | 21 | 22 | 23 | 24 | 15 | 06 | 17 | 28 | 29 | 2A | 2B | 2C | D9 | DA | 1B |
| 9- | 30 | 31 | 1A | 33 | 34 | 35 | 36 | 08 | 38 | 39 | 3A | 3B | D4 | 14 | 3E | FF |
| A- | 41 | AA | B0 | B1 | 9F | B2 | 6A | 85 | BD | B4 | 9A | DA | BA | CA | AF | BC |
| B- | 90 | 8F | EA | FA | BE | AD | B6 | 83 | 9D | DA | 9B | 8B | 87 | 88 | B9 | AB |
| C- | 64 | 65 | 62 | 66 | 63 | 67 | 9E | 68 | 74 | 71 | 72 | 73 | 78 | 75 | 76 | 77 |
| D- | AC | 69 | ED | EE | EB | EF | EC | BF | 80 | FD | FE | FB | FC | AD | AE | 59 |
| E- | 44 | 45 | 42 | 46 | 43 | 47 | 9C | 48 | 54 | 51 | 52 | 53 | 58 | 55 | 56 | 57 |
| F- | 8C | 49 | CD | CE | CB | CF | CC | E1 | 70 | DD | DE | DB | DC | 8D | 8E | DF |

| Hi | →Lo Nibble of E2-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | DD | 01 | 02 | 03 | 9C | D9 | 86 | 7F | 97 | 8D | BE | DB | DC | DD | DE | DF |
| 1- | 10 | 11 | 12 | 13 | 9D | 85 | D8 | 87 | 18 | 19 | 92 | 8F | 1C | 1B | 1E | 1F |
| 2- | 80 | B1 | 82 | 83 | 84 | 0A | 17 | 1B | 88 | 89 | BA | 8B | 8C | D5 | 06 | 07 |
| 3- | 9D | 91 | 16 | 93 | 94 | 95 | 96 | D4 | 98 | 99 | 9A | 9B | 14 | 159[00a3] | 1A |   |
| 4- | 20 | AD | E2 | E4 | ED | E1 | E3 | E5 | E7 | F1 | 5B | 2E | 3C | 28 | 2B | 21 |
| 5- | 26 | E9 | EA | EB | E8 | ED | EE | EF | EC | DF | 5D | 24 | 2A | 29 | 3B | 5E |
| 6- | 2D | 2F | C2 | C4 | CD | C1 | C3 | C5 | C7 | D1 | A6 | 2C | 25 | 5F | 3E | 3F |
| 7- | F8 | C9 | CA | CB | C8 | CD | CE | CF | CC | 6D | 3A | 23 | 4D | 27 | 3D | 22 |
| 8- | D8 | 61 | 62 | 63 | 64 | 65 | 66 | 67 | 68 | 69 | AB | BB | FD | FD | FE | B1 |
| 9- | BD | 6A | 6B | 6C | 6D | 6E | 6F | 7D | 71 | 72 | AA | BA | E6 | B8 | C6 | A4 |
| A- | 85 | 7E | 73 | 74 | 75 | 76 | 77 | 78 | 79 | 7A | A1 | BF | DD | DD | DE | AE |
| B- | A2 | A3 | A5 | B7 | A9 | A7 | B6 | BC | BD | BE | AC | 7C | AF | AD | B4 | D7 |
| C- | 7B | 41 | 42 | 43 | 44 | 45 | 46 | 47 | 48 | 49 | AD | F4 | F6 | F2 | F3 | F5 |
| D- | 7D | 4A | 4B | 4C | 4B | 4E | 4F | 5D | 51 | 52 | B9 | FB | FC | F9 | FA | FF |
| E- | 5C | F7 | 53 | 54 | 55 | 56 | 57 | 58 | 59 | 5A | D2 | D4 | D6 | D2 | D3 | D5 |
| F- | 3D | 31 | 32 | 33 | 34 | 35 | 36 | 37 | 38 | 39 | B3 | DB | DC | D9 | DA | 9F |

TABLE 4

| Hi ↓ | →Lo Nibble of E2-string | | | | | | | | | | | | | | | |
|---|---|---|---|---|---|---|---|---|---|---|---|---|---|---|---|---|
|  | -0 | -1 | -2 | -3 | -4 | -5 | -6 | -7 | -8 | -9 | -A | -B | -C | -D | -E | -F |
| 0- | cc | cc | cc | cc | cc | cc | cc | cc | cc | cc | cc | cc | cc | cc | cc | cc |
| 1- | cc | cc | cc | cc | cc | cc | cc | cc | cc | cc | cc | cc | cc | cc | cc | cc |
| 2- | cc | cc | cc | cc | cc | cc | cc | cc | cc | cc | cc | cc | cc | cc | cc | cc |
| 3- | cc | cc | cc | cc | cc | cc | cc | cc | cc | cc | cc | cc | cc | cc | cc | cc |
| 4- | ii | tt | 33 | 33 | 33 | 33 | 33 | 33 | 33 | 44 | vv | ii | ii | ii | ii | vv |
| 5- | ii | 33 | 33 | 33 | 33 | 33 | 33 | 33 | 33 | 22 | vv | vv | ii | ii | ii | vv |
| 6- | ii | ii | 22 | 22 | 22 | 22 | 22 | 22 | 22 | 22 | tt | ii | ii | ii | ii | ii |
| 7- | 55 | 22 | 22 | 22 | 22 | 22 | 22 | 22 | 22 | vv | ii | vv | vv | ii | ii | ii |
| 8- | 22 | ii | ii | ii | ii | ii | ii | ii | ii | ii | tt | tt | 44 | 66 | 77 | tt |
| 9- | tt | ii | ii | ii | ii | ii | ii | ii | ii | ii | tt | tt | 33 | tt | 22 | tt |
| A- | tt | vv | ii | ii | ii | ii | ii | ii | ii | ii | tt | tt | 22 | 22 | 22 | tt |
| B- | tt | tt | tt | tt | tt | tt | tt | tt | tt | tt | tt | vv | tt | tt | tt | 22 |
| C- | vv | ii | ii | ii | ii | ii | ii | ii | ii | ii | tt | 44 | 44 | 44 | 44 | 44 |
| D- | vv | ii | ii | ii | ii | ii | ii | ii | ii | ii | tt | 55 | 66 | 55 | 55 | 77 |
| E- | vv | 44 | ii | ii | ii | ii | ii | ii | ii | ii | tt | 22 | 22 | 22 | 22 | 22 |
| F- | ii | ii | ii | ii | ii | ii | ii | ii | ii | ii | tt | 22 | 22 | 22 | 22 | cc |

Legend:
cc = control character; ii = invariant, part of syntactic character set; vv = variant - part of ISO/IEC 646 (IRV) (ASCII) but varies among EBCDIC code page definitions; all cc, ii and vv octets are single octets. tt = trailing octet in a multiple-octet En-string: 22, 33, 44, 55, 66, 77 = First of 2-octet, first of 3-octet, . . . , or first of 7-octet in a multiple-octet En-string.

TABLE 5

| Hi ↓ | →Lo Nibble of I8-string | | | | | | | | | | | | | | | |
|---|---|---|---|---|---|---|---|---|---|---|---|---|---|---|---|---|
|  | -0 | -1 | -2 | -3 | -4 | -5 | -6 | -7 | -8 | -9 | -A | -B | -C | -D | -E | -F |
| 0- | 00 | 01 | 02 | 03 | 37 | 2D | 2E | 2F | 16 | 05 | 25 | 0B | 0C | 0D | 0E | 0F |
| 1- | 10 | 11 | 12 | 13 | 3C | 3D | 32 | 26 | 18 | 19 | 3F | 27 | 1C | 1D | 1E | 1F |
| 2- | 40 | 5A | 7F | 7B | 5B | 6C | 50 | 7D | 4D | 5D | 5C | 4E | 68 | 60 | 4B | 61 |
| 3- | F0 | F1 | F2 | F3 | F4 | F5 | F6 | F7 | F8 | F9 | 7A | 5E | 4C | 7E | 6E | 6F |
| 4- | 7C | C1 | C2 | C3 | C4 | C5 | C6 | C7 | C8 | C9 | D1 | D2 | D3 | D4 | 05 | D6 |
| 5- | D7 | 08 | D9 | E2 | E3 | E4 | E5 | E6 | E7 | E8 | E9 | AD | E0 | BD | 5F | 6D |
| 6- | 79 | 81 | 82 | 83 | 84 | 85 | 86 | 87 | 88 | 89 | 91 | 92 | 93 | 94 | 95 | 96 |
| 7- | 97 | 98 | 99 | A2 | A3 | A4 | A5 | A6 | A7 | AB | A9 | C0 | 4F | D0 | A1 | 07 |
| 8- | 20 | 21 | 22 | 23 | 24 | 15 | 06 | 17 | 28 | 29 | 2A | 2B | 2C | 09 | CA | 1B |
| 9- | 30 | 31 | 1A | 33 | 34 | 35 | 36 | 08 | 38 | 39 | 3A | 3B | 04 | 14 | 3E | FF |
| A- | 41 | AA | 4A | B1 | 9F | B2 | 6A | 85 | BB | B4 | 9A | 8A | BD | CA | AF | BC |
| B- | 90 | 8F | EA | FA | 8E | A0 | 86 | 83 | 9D | DA | 9B | 8B | B7 | B8 | B9 | AB |
| C- | 64 | 65 | 62 | 66 | 63 | 67 | 9E | 68 | 74 | 71 | 72 | 73 | 78 | 75 | 76 | 77 |
| D- | AC | 69 | ED | EE | EB | EF | EC | 8F | 80 | FD | FE | F8 | FC | BA | AE | 59 |
| E- | 44 | 45 | 42 | 46 | 43 | 47 | 9C | 48 | 54 | 51 | 52 | 53 | 58 | 55 | 56 | 57 |
| F- | 8C | 49 | CD | CE | CB | CF | CC | E1 | 70 | DD | DE | 0B | DC | 8D | 8E | DF |

| Hi ↓ | →Lo Nibble of E3-string | | | | | | | | | | | | | | | |
|---|---|---|---|---|---|---|---|---|---|---|---|---|---|---|---|---|
|  | -0 | -1 | -2 | -3 | -4 | -5 | -6 | -7 | -8 | -9 | -A | -B | -C | -D | -E | -F |
| 0- | 00 | 01 | 02 | 03 | 9C | 09 | 86 | 7F | 97 | 8D | 8E | 0B | 0C | 0D | 0E | 0F |
| 1- | 10 | 11 | 12 | 13 | 9D | 85 | 08 | 87 | 18 | 19 | 92 | 8F | 1C | 1D | 1E | 1F |
| 2- | 80 | 81 | 82 | 83 | 84 | 0A | 17 | 1B | 88 | 89 | 8A | 88 | 8C | 05 | 06 | 07 |
| 3- | 9D | 91 | 16 | 93 | 94 | 95 | 96 | 04 | 98 | 99 | 9A | 98 | 14 | 15 | 9E | 1A |
| 4- | 20 | A0 | E2 | E4 | E0 | E1 | E3 | E5 | E7 | F1 | A2 | 2E | 3C | 28 | 2B | 7C |
| 5- | 26 | E9 | EA | EB | E8 | ED | EE | EF | EC | DF | 21 | 24 | 2A | 29 | 38 | AC |
| 6- | 2D | 2F | C2 | C4 | C0 | C1 | C3 | C5 | C7 | D1 | A6 | 2C | 25 | 5F | 3E | 3F |
| 7- | F8 | C9 | CA | C8 | C8 | CD | CE | CF | CC | 60 | 3A | 23 | 40 | 27 | 3D | 22 |
| 8- | D8 | 61 | 62 | 63 | 64 | 65 | 66 | 67 | 68 | 69 | AB | BB | F0 | FD | FE | B1 |
| 9- | B0 | 6A | 68 | 6C | 6D | 6E | 6F | 70 | 71 | 72 | AA | BA | E6 | BB | C6 | A4 |
| A- | B5 | 7E | 73 | 74 | 75 | 76 | 77 | 78 | 79 | 7A | A1 | BF | DD | DD | DE | AE |
| B- | 5E | A3 | A5 | B7 | A9 | A7 | B6 | BC | BB | BE | 5B | 5D | AF | A8 | 84 | D7 |
| C- | 7B | 41 | 42 | 43 | 44 | 45 | 46 | 47 | 48 | 49 | AD | F4 | F6 | F2 | F3 | F5 |
| D- | 7D | 4A | 4B | 4C | 4D | 4E | 4F | 50 | 51 | 52 | B9 | FB | FC | F9 | FA | FF |
| E- | 5C | F7 | 53 | 54 | 55 | 56 | 57 | 58 | 59 | 5A | 82 | D4 | D6 | D2 | D3 | D5 |
| F- | 30 | 31 | 32 | 33 | 34 | 35 | 36 | 37 | 38 | 39 | B3 | DB | DC | D9 | DA | 9F |

TABLE 6

| Hi | | | | | | | →Lo Nibble of E3-string | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | cc | cc | cc | cc | cc | cc | cc | cc | cc | cc | cc | cc | cc | cc | cc | cc |
| 1- | cc | cc | cc | cc | cc | cc | cc | cc | cc | cc | cc | cc | cc | cc | cc | cc |
| 2- | cc | cc | cc | cc | cc | cc | cc | cc | cc | cc | cc | cc | cc | cc | cc | cc |
| 3- | cc | cc | cc | cc | cc | cc | cc | cc | cc | cc | cc | cc | cc | cc | cc | cc |
| 4- | ii | tt | 33 | 33 | 33 | 33 | 33 | 33 | 33 | 44 | tt | ii | ii | ii | ii | vv |
| 5- | ii | 33 | 33 | 33 | 33 | 33 | 33 | 33 | 33 | 22 | vv | vv | ii | ii | ii | tt |
| 6- | ii | ii | 22 | 22 | 22 | 22 | 22 | 22 | 22 | 22 | tt | ii | ii | ii | ii | ii |
| 7- | 55 | 22 | 22 | 22 | 22 | 22 | 22 | 22 | 22 | vv | ii | vv | vv | ii | ii | ii |
| 8- | 22 | ii | ii | ii | ii | ii | ii | ii | ii | ii | tt | tt | 44 | 66 | 77 | tt |
| 9- | tt | ii | ii | ii | ii | ii | ii | ii | ii | ii | tt | tt | 33 | tt | 22 | tt |
| A- | tt | vv | ii | ii | ii | ii | ii | ii | ii | ii | tt | tt | 22 | 22 | 22 | tt |
| B- | vv | tt | tt | tt | tt | tt | tt | tt | tt | tt | vv | vv | tt | tt | tt | 22 |
| C- | vv | ii | ii | ii | ii | ii | ii | ii | ii | ii | tt | 44 | 44 | 44 | 44 | 44 |
| D- | vv | ii | ii | ii | ii | ii | ii | ii | ii | ii | tt | 55 | 66 | 55 | 55 | 77 |
| E- | vv | 44 | ii | ii | ii | ii | ii | ii | ii | ii | tt | 22 | 22 | 22 | 22 | 22 |
| F- | ii | ii | ii | ii | ii | ii | ii | ii | ii | ii | tt | 22 | 22 | 22 | 22 | cc |

Legend:
cc = control character; ii = invariant, part of syntactic character set; vv = variant - part of ISO/IEC 646 (IRV) (ASCII) but varies among EBCDIC code page definitions; all cc, ii and vv octets are single octets. tt = trailing octet in a multiple-octet En-string: 22, 33, 44, 55, 66, 77 = First of 2-octet, first of 3-octet, . . . , or first of 7-octet in a multiple-octet En-string.

APPENDIX H

TABLE 1

| I8-string Octets | Classification | Number of Octets in the Grouping | E4-string Octets (in hexadecimal) |
|---|---|---|---|
| C0–DF | First of two | 32 | 42–49, 52–59, 62–69, 71–78 |
| E0–EF | First of three | 16 | 8A, 9A, AA, BA, CA, DA, EA, FA, 8B, 9B, AB, BB, CB, DB, EB, FB |
| F0–F7 | First of four | 8 | B2–B9 |
| F8–FB | First of five | 4 | 6A, 70, B0, B1 |
| FC, FD | First o fsix | 2 | 41, 51 |
| FE, FF | First of seven | 2 | 4A, E1 |
| A0–BF | Trailing Octets | 32 | 80, 8C–8F, 90, 9C–9F, A0, AC, AE, AF, BC, BE, BF, CC–CF, DC–DF, EC–EF, FC–FE |
| Note: All the trailing octets are greater than 7F | | | |
| 00–1F, 7F–9F | Control Characters | 65 | 00–3F, FF (same as E1, E2, E3) |
| 20–7E | G0 set of graphics characters | 95 | Invariance positions in 1047, all remaining code points (same as E1) |

TABLE 2

| Hi | | | | | | | →Lo Nibble of E4-string | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | cc | cc | cc | cc | cc | cc | cc | cc | cc | cc | cc | cc | cc | cc | cc | cc |
| 1- | cc | cc | cc | cc | cc | cc | cc | cc | cc | cc | cc | cc | cc | cc | cc | cc |
| 2- | cc | cc | cc | cc | cc | cc | cc | cc | cc | cc | cc | cc | cc | cc | cc | cc |
| 3- | cc | cc | cc | cc | cc | cc | cc | cc | cc | cc | cc | cc | cc | cc | cC | cc |
| 4- | ii | .. | .. | .. | .. | .. | .. | .. | .. | .. | .. | ii | ii | ii | ii | vv |
| 5- | ii | .. | .. | .. | .. | .. | .. | .. | .. | .. | vv | vv | ii | ii | ii | vv |
| 6- | ii | ii | .. | .. | .. | .. | .. | .. | .. | .. | .. | ii | ii | ii | ii | ii |
| 7- | .. | .. | .. | .. | .. | .. | .. | .. | .. | vv | ii | vv | vv | ii | ii | ii |
| 8- | .. | a | b | c | d | e | f | g | h | i | .. | .. | .. | .. | .. | .. |
| 9- | .. | j | k | l | m | n | o | p | q | r | .. | .. | .. | .. | .. | .. |
| A- | .. | vv | s | t | u | v | w | x | y | z | .. | .. | .. | vv | .. | .. |
| B- | .. | .. | .. | .. | .. | .. | .. | .. | .. | .. | .. | .. | .. | vv | .. | .. |
| C- | vv | A | B | C | D | E | F | G | H | I | .. | .. | .. | .. | .. | .. |

TABLE 2-continued

| Hi | →Lo Nibble of E4-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| D- | vv | J | K | L | M | N | O | P | Q | R | .. | .. | .. | .. | .. | .. |
| E- | vv | .. | S | T | U | V | W | X | Y | Z | .. | .. | .. | .. | .. | .. |
| F- | 0 | 1 | 2 | 3 | 4 | 5 | 6 | 7 | 8 | 9 | .. | .. | .. | .. | .. | cc |

Legend:
cc = control character; ii = invariant, part of syntactic character set; vv = variant - part of ISO/IEC 646 (IRV) (ASCII) but varies among EBCDIC code page definitions; all cc, ii and vv octets are single octets. '..' available for assigning to lead and trailing octets. The letters a–z, A–Z and digits 0–9 are shown in their invariant positions.

TABLE 3

| Hi | →Lo Nibble of E4-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | cc | cc | cc | cc | cc | cc | cc | cc | cc | cc | cc | cc | cc | cc | cc | cc |
| 1- | cc | cc | cc | cc | cc | cc | cc | cc | cc | cc | cc | cc | cc | cc | cc | cc |
| 2- | cc | cc | cc | cc | cc | cc | cc | cc | cc | cc | cc | cc | cc | cc | cc | cc |
| 3- | cc | cc | cc | cc | cc | cc | cc | cc | cc | cc | cc | cc | cc | cc | cc | cc |
| 4- | ii | 66 | 22 | 22 | 22 | 22 | 22 | 22 | 22 | 22 | 77 | ii | ii | ii | ii | vv |
| 5- | ii | 66 | 22 | 22 | 22 | 22 | 22 | 22 | 22 | 22 | vv | vv | ii | ii | ii | vv |
| 6- | ii | ii | 22 | 22 | 22 | 22 | 22 | 22 | 22 | 22 | 55 | ii | ii | ii | ii | ii |
| 7- | 55 | 22 | 22 | 22 | 22 | 22 | 22 | 22 | 22 | vv | ii | vv | vv | ii | ii | ii |
| 8- | tt | a | b | c | d | e | f | g | h | i | 33 | 33 | tt | tt | tt | tt |
| 9- | tt | j | k | l | m | n | o | p | q | r | 33 | 33 | tt | tt | tt | tt |
| A- | tt | vv | s | t | u | v | w | x | y | z | 33 | 33 | tt | vv | tt | tt |
| B- | 55 | 55 | 44 | 44 | 44 | 44 | 44 | 44 | 44 | 44 | 33 | 33 | tt | vv | tt | tt |
| C- | vv | A | B | C | D | E | F | G | H | I | 33 | 33 | tt | tt | tt | tt |
| D- | vv | J | K | L | M | N | O | P | Q | R | 33 | 33 | tt | tt | tt | tt |
| E- | vv | 77 | S | T | U | V | W | X | Y | Z | 33 | 33 | tt | tt | tt | tt |
| F- | 0 | 1 | 2 | 3 | 4 | 5 | 6 | 7 | 8 | 9 | 33 | 33 | tt | tt | tt | cc |

Legend:
cc = control character; ii = invariant, part of syntactic character set; vv = variant - part of ISO/IEC 646 (IRV) (ASCII) but varies among EBCDIC code page definitions; all cc, ii and vv octets are single octets. tt = trailing octet in a multiple-octet En-string; 22, 33, 44, 55, 66, 77 = First of 2-octet, first of 3-octet, . . . , or first of 7-octet in a multiple-octet En-string. The letters a–z, A–Z and digits 0–9 are also shown in their invariant positions.

TABLE 4

| Hi | →Lo Nibble of I8-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | 00 | 01 | 02 | 03 | 37 | 2D | 2E | 2F | 16 | 05 | 25 | 08 | 0C | 0D | 0E | 0F |
| 1- | 10 | 11 | 12 | 13 | 3C | 3D | 32 | 26 | 18 | 19 | 3F | 27 | 1C | 1D | 1E | 1F |
| 2- | 40 | 5A | 7F | 7B | 58 | 6C | 50 | 7D | 4D | 5D | 5C | 4E | 6B | 60 | 4B | 61 |
| 3- | F0 | F1 | F2 | F3 | F4 | F5 | F6 | F7 | FB | F9 | 7A | 5E | 6E | 6F | 6E | 6F |
| 4- | 7C | C1 | C2 | C3 | C4 | C5 | C6 | C7 | C8 | C9 | D1 | D2 | D3 | D4 | D5 | D6 |
| 5- | D7 | D8 | D9 | E2 | E3 | E4 | E5 | E6 | E7 | E8 | E9 | AD | E0 | BD | 5F | 6D |
| 6- | 79 | 81 | 82 | 83 | 84 | 85 | 86 | 87 | 88 | 89 | 91 | 92 | 93 | 94 | 95 | 96 |
| 7- | 97 | 98 | 99 | A2 | A3 | A4 | A5 | A6 | A7 | A8 | A9 | C0 | 4F | D0 | A1 | 07 |
| 8- | 20 | 21 | 22 | 23 | 24 | 15 | 06 | 17 | 28 | 29 | 2A | 2B | 2C | 09 | 0A | 1B |
| 9- | 30 | 31 | 1A | 33 | 34 | 35 | 36 | 08 | 38 | 39 | 3A | 3B | 04 | 14 | 3E | FF |
| A- | 80 | BC | 8D | 8E | 8F | 90 | 9C | 9D | 9E | 9F | AD | AC | AE | AF | BC | BE |
| B- | BF | CC | CD | CE | CF | DC | DD | 0E | DF | EC | ED | EE | EF | FC | FD | FE |
| C- | 42 | 43 | 44 | 45 | 46 | 47 | 48 | 49 | 52 | 53 | 54 | 55 | 56 | 57 | 58 | 59 |
| D- | 62 | 63 | 64 | 65 | 66 | 67 | 68 | 69 | 71 | 72 | 73 | 74 | 75 | 76 | 77 | 78 |
| E- | 8A | 9A | AA | BA | CA | DA | EA | FA | 8B | 9B | AB | BB | CB | DB | EB | FB |
| F- | B2 | B3 | B4 | B5 | B6 | B7 | B8 | B9 | 6A | 70 | B0 | B1 | 41 | 51 | 4A | E1 |

| Hi | →Lo Nibble of E4-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | 00 | 01 | 02 | 03 | 9C | 09 | 86 | 7F | 97 | 8D | 8E | 0B | 0C | 0D | 0E | 0F |

TABLE 4-continued

| | -0 | -1 | -2 | -3 | -4 | -5 | -6 | -7 | -8 | -9 | -A | -B | -C | -D | -E | -F |
|---|---|---|---|---|---|---|---|---|---|---|---|---|---|---|---|---|
| 1- | 10 | 11 | 12 | 13 | 9D | 85 | 08 | 87 | 18 | 19 | 92 | BF | 1C | 1D | 1E | 1F |
| 2- | 80 | 81 | 82 | 83 | 84 | 0A | 17 | 1B | 88 | 89 | 8A | 8B | 8C | 05 | 06 | 07 |
| 3- | 90 | 91 | 16 | 93 | 94 | 95 | 96 | 04 | 98 | 99 | 9A | 9B | 14 | 15 | 9E | 1A |
| 4- | 20 | FC | C0 | C1 | C2 | C3 | C4 | C5 | C6 | C7 | FE | 2E | 3C | 28 | 28 | 7C |
| 5- | 26 | FD | C8 | C9 | CA | CB | CC | CD | CE | CF | 21 | 24 | 2A | 29 | 3B | 5E |
| 6- | 2D | 2F | D0 | D1 | D2 | D3 | D4 | D5 | D6 | D7 | F8 | 2C | 25 | 5F | 3E | 3F |
| 7- | F9 | D8 | D9 | DA | DB | DC | DD | DE | DF | 60 | 3A | 23 | 40 | 27 | 30 | 22 |
| 8- | A0 | 61 | 62 | 63 | 64 | 65 | 66 | 67 | 68 | 69 | E0 | E8 | A1 | A2 | A3 | A4 |
| 9- | A5 | 6A | 6B | 6C | 6D | 6E | 6F | 70 | 71 | 72 | E1 | E9 | A6 | A7 | A8 | A4 |
| A- | AA | 7E | 73 | 74 | 75 | 76 | 77 | 78 | 79 | 7A | E2 | EA | AB | 5B | AC | AD |
| B- | FA | FB | F0 | F1 | F2 | F3 | F4 | F5 | F6 | F7 | E3 | EB | AE | 5D | AF | B0 |
| C- | 7B | 41 | 42 | 43 | 44 | 45 | 16 | 47 | 48 | 49 | E4 | EC | B1 | B2 | B3 | B4 |
| D- | 7D | 4A | 4B | 4C | 4D | 4E | 4F | 50 | 51 | 52 | E5 | E0 | B5 | B6 | B7 | B8 |
| E- | 5C | FF | 53 | 54 | 55 | 56 | 57 | 58 | 59 | 5A | E6 | EE | B9 | BA | BB | BC |
| F- | 30 | 31 | 32 | 33 | 34 | 35 | 36 | 37 | 38 | 39 | E7 | EF | BD | BE | BF | 9F |

APPENDIX I

TABLE 1

| I8-string Octets | Classification | Number of Octets in the Grouping | E5-string Octets (in hexadecimal) |
|---|---|---|---|
| C0–DF | First of two | 32 | 81–8A, 8C–9A, 9C–9F, AC–AE |
| E0–EF | First of three | 16 | 41–4A, 51–56 |
| F0–F7 | First of four | 8 | A1–A8 |
| F8–FB | First of five | 4 | 57–59, 5B |
| FC, FD | First of six | 2 | A9, AA |
| FE, FF | First of seven | 2 | 5F, 6A |
| A0–BF | Trailing Octets | 32 | AF, B1, BA–BF, CA–CF, DA–DF, E1, EA–EF, FA–FE |

Note: All the trailing octets are greater than AE

| | | | |
|---|---|---|---|
| 00–1F, 7F–9F | Control Characters | 65 | 00–3F, FF (same as E1, E2, E3) |
| 20–7E | G0 set of graphics characters | 95 | As mapped in code page 290 |

TABLE 2

| Hi | →Lo Nibble of I8-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | 00 | 01 | 02 | 03 | 37 | 20 | 2E | 2F | 16 | 05 | 25 | 0B | 0C | 0D | 0E | 0F |
| 1- | 1D | 11 | 12 | 13 | 3C | 3D | 32 | 26 | 18 | 19 | 3F | 27 | 1C | 1D | 1E | 1F |
| 2- | 40 | 5A | 7F | 7B | E0 | 6C | 50 | 7D | 4D | 5D | 5C | 4E | 6B | 60 | 4B | 61 |
| 3- | FD | F1 | F2 | F3 | F4 | F5 | F6 | F7 | F8 | F9 | 7A | 5E | 4C | 7E | 6E | 6F |
| 4- | 7C | C1 | C2 | C3 | C4 | C5 | C6 | C7 | C8 | C9 | D1 | D2 | D3 | D4 | D5 | D6 |
| 5- | 07 | D8 | D9 | E2 | E3 | E4 | E5 | E6 | E7 | E8 | E9 | 70 | B2 | 80 | B0 | 6D |
| 6- | 79 | 62 | 63 | 64 | 65 | 66 | 67 | 68 | 69 | 71 | 72 | 73 | 74 | 75 | 76 | 77 |
| 7- | 78 | 8B | 9B | AB | B3 | B4 | B5 | B6 | B7 | B8 | B9 | C0 | 4F | D0 | A0 | 07 |
| 8- | 20 | 21 | 22 | 23 | 24 | 15 | 06 | 17 | 28 | 29 | 2A | 2B | 2C | 09 | DA | 1B |
| 9- | 3D | 31 | 1A | 33 | 34 | 35 | 36 | 08 | 38 | 39 | 3A | 38 | 04 | 14 | 3E | FF |
| A- | B1 | BA | BB | BC | DD | BE | BF | CA | CB | CC | CD | CE | CF | DA | DB | DC |
| B- | DD | DE | DF | E1 | EA | EB | EC | ED | EE | EF | FA | FB | FC | FD | FE | AF |
| C- | 81 | 82 | 83 | 84 | 85 | 86 | 87 | 88 | 89 | 8A | 8C | 8D | 8E | 8F | 9D | 91 |
| D- | 92 | 93 | 94 | 95 | 96 | 97 | 98 | 99 | 9A | 9C | 9D | 9E | 9F | AC | AD | AE |
| E- | 41 | 42 | 43 | 44 | 45 | 46 | 47 | 48 | 49 | 4A | 51 | 52 | 53 | 54 | 55 | 56 |
| F- | A1 | A2 | A3 | A4 | A5 | A6 | A7 | A8 | 57 | 58 | 59 | 5B | A9 | AA | 6A | 5F |

| Hi | →Lo Nibble of E3-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | 0D | 01 | 02 | 03 | 9C | 09 | 86 | 7F | 97 | 8D | 8E | 0B | 0C | 0D | 0E | 0F |
| 1- | 1D | 11 | 12 | 13 | 9D | 85 | 08 | 87 | 18 | 19 | 92 | 8F | 1C | 1D | 1E | 1F |
| 2- | 80 | 81 | 82 | 83 | 84 | 0A | 17 | 1B | 88 | 89 | 8A | 8B | 8C | D5 | 06 | 07 |
| 3- | 90 | 91 | 16 | 93 | 94 | 95 | 96 | 04 | 98 | 99 | 9A | 9B | 14 | 15 | 9E | 1A |
| 4- | 20 | E0 | E1 | E2 | E3 | E4 | E5 | E6 | E7 | E8 | E9 | 2E | 3C | 28 | 2B | 7C |

TABLE 2-continued

| 5- | 26 | EA | EB | EC | ED | EE | EF | F8 | F9 | FA | 21 | FB | 2A | 29 | 3B | FF |
| 6- | 2D | 2F | 61 | 62 | 63 | 64 | 65 | 66 | 67 | 68 | FE | 2C | 25 | 5F | 3E | 3F |
| 7- | 5B | 69 | 6A | 6B | 6C | 6D | 6E | 6F | 70 | 60 | 3A | 23 | 40 | 27 | 3D | 22 |
| 8- | 5D | CD | C1 | C2 | C3 | C4 | C5 | C6 | C7 | C8 | C9 | 71 | CA | CB | CC | CD |
| 9- | CE | CF | D0 | D1 | D2 | D3 | D4 | D5 | D6 | D7 | D8 | 72 | D9 | DA | DB | DC |
| A- | 7E | FD | F1 | F2 | F3 | F4 | F5 | F6 | F7 | FC | FD | 73 | DD | DE | DF | BF |
| B- | 5E | A0 | 5C | 74 | 75 | 76 | 77 | 78 | 79 | 7A | A1 | A2 | A3 | A4 | A5 | A6 |
| C- | 7B | 41 | 42 | 43 | 44 | 45 | 46 | 47 | 48 | 49 | A7 | A8 | A9 | AA | AB | AC |
| D- | 7D | 4A | 4B | 4C | 4D | 4E | 4F | 5D | 51 | 52 | AD | AE | AF | BD | D1 | B2 |
| E- | 24 | B3 | 53 | 54 | 55 | 56 | 57 | 58 | 59 | 5A | B4 | B5 | B6 | B7 | B8 | B9 |
| F- | 30 | 31 | 32 | 33 | 34 | 35 | 36 | 37 | 38 | 39 | BA | BB | BC | BD | BE | 9F |

TABLE 3

| Hi | →Lo Nibble of E4-string | | | | | | | | | | | | | | | |
|---|---|---|---|---|---|---|---|---|---|---|---|---|---|---|---|---|
| ↓ | -0 | -1 | -2 | -3 | -4 | -5 | -6 | -7 | -8 | -9 | -A | -B | -C | -D | -E | -F |
| 0- | cc | cc | cc | cc | cc | cc | cc | cc | cc | cc | cc | cc | cc | cc | cc | cc |
| 1- | cc | cc | cc | cc | cc | cc | cc | cc | cc | cc | cc | cc | cc | cc | cc | cc |
| 2- | cc | cc | cc | cc | cc | cc | cc | cc | cc | cc | cc | cc | cc | cc | cc | cc |
| 3- | cc | cc | cc | cc | cc | cc | cc | cc | cc | cc | cc | cc | cc | cc | cc | cc |
| 4- | ii | 33 | 33 | 33 | 33 | 33 | 33 | 33 | 33 | 33 | 33 | ii | ii | ii | ii | vv |
| 5- | ii | 33 | 33 | 33 | 33 | 33 | 33 | 55 | 55 | 55 | vv | 55 | ii | ii | ii | 77 |
| 6- | ii | ii | a | b | c | d | e | f | g | h | 77 | ii | ii | ii | ii | ii |
| 7- | vv | i | j | k | l | m | n | o | p | vv | ii | vv | vv | ii | ii | ii |
| 8- | vv | 22 | 22 | 22 | 22 | 22 | 22 | 22 | 22 | 22 | 22 | q | 22 | 22 | 22 | 22 |
| 9- | 22 | 22 | 22 | 22 | 22 | 22 | 22 | 22 | 22 | 22 | 22 | r | 22 | 22 | 22 | 22 |
| A- | vv | 44 | 44 | 44 | 44 | 44 | 44 | 44 | 44 | 66 | 66 | s | 22 | 22 | 22 | tt |
| B- | vv | tt | vv | t | u | v | w | x | y | z | tt | tt | tt | tt | tt | tt |
| C- | vv | A | B | C | D | E | F | G | H | I | tt | tt | tt | tt | tt | tt |
| D- | vv | J | K | L | M | N | O | P | Q | R | tt | tt | tt | tt | tt | tt |
| E- | vv | tt | S | T | U | V | W | X | Y | Z | tt | tt | tt | tt | tt | tt |
| F- | 0 | 1 | 2 | 3 | 4 | 5 | 6 | 7 | 8 | 9 | tt | tt | tt | tt | tt | cc |

Legend:
cc = control character; ii = invariant, part of syntactic character set; vv = variant - part of ISO/IEC 646 (IRV) (ASCII) but varies among EBCDIC code page definitions; all cc, ii and vv octets are single octets. tt = trailing octet in a multiple-octet En-string; 22, 33, 44, 55, 66, 77 = First of 2-octet, first of 3-octet, . . . , or first of 7-octet in a multiple-octet En-string. The letters a–z, A–Z and digits 0–9 are also shown in their invariant positions. Note that lowercase a–z are not in their traditional EBCDIC invariant positions.

We claim:

1. A method of transforming information from a fixed-length multiple-octet representation to a target variable-length multiple-octet representation, the transformation ensuring that a selected set of characters are represented by single octets in said target representation, comprising the steps of:

(i) receiving an input character string in said fixed-length representation and transforming said input character string to a variable-length multiple-octet intermediate representation, said transformation producing a single octet representation in said intermediate representation for a pre-selected set of input characters in said fixed-length representation;

(ii) receiving a character string in said intermediate representation and transforming said character string to an equivalent number of octets in said target representation, said transformation maintaining characters represented by single octets in said intermediate representation as characters represented as single octets in said target second representation.

2. The method of claim 1 wherein said transformation from said intermediate representation to said target representation is performed on an octet by octet basis.

3. The method of claim 1 wherein said fixed-length multiple octet representation is UCS.

4. The method of claim 3 wherein said fixed-length multiple octet representation is UCS-2.

5. The method of claim 3 wherein said fixed-length multiple octet representation is Unicode.

6. The method of claim 3 wherein said fixed-length multiple octet representation is UCS-4.

7. The method of claim 3 wherein said target representation is EBCDIC-friendly.

8. The method of claim 7 wherein said pre-selected set of characters comprises the sixty-five control characters defined in EBCDIC and the G0 characters set.

9. The method of claim 8 wherein said pre-selected set of characters are assigned to a pre-defined set of single-octet values when transformed from said intermediate representation.

10. The method of claim 9 wherein said pre-defined set of single-octet values is selected by specifying a code page for said target EBCDIC-friendly representation.

11. The method of claim 7 wherein said EBCDIC-friendly representation is defined such that the value of the most significant octet of a majority of multi-octet EBCDIC-friendly characters are contiguous.

12. A method of transforming information from a variable-length multiple-octet representation to a fixed-length multiple-octet representation, comprising the steps of:

(i) receiving an input character string in said variable-length representation and transforming said input character string to the same number of octets in a variable-length multiple-octet intermediate representation; and (ii) examining said character string which has been transformed to said intermediate representation to determine the number of octets representing each character and transforming each character represented by said determined number of octets to a corresponding value in said fixed-length multiple octet representation.

13. The method of claim 12 wherein said variable-length multiple-octet representation is an EBCDIC-friendly representation.

14. The method of claim 13 wherein said fixed-length multiple-octet representation is UCS.

15. The method of claim 14 wherein said fixed-length multiple-octet representation is UCS-2.

16. The method of claim 14 wherein said fixed-length multiple-octet representation is Unicode.

17. The method of claim 14 wherein said fixed-length multiple-octet representation is UCS-4.

18. The method of claim 13 wherein said EBCDIC-friendly representation is defined such that the value of the most significant octets of a majority of multi-octet EBCDIC-friendly characters are contiguous.

19. A method of transforming information from a fixed-length multiple-octet representation to a variable-length multiple-octet representation by receiving an input character string in said fixed-length representation and transforming said input character string to said variable-length multiple-octet representation, said transformation producing a single octet representation in said variable-length representation for a pre-selected set of input characters in said fixed-length representation.

20. The method of claim 19 wherein said fixed-length multiple-octet representation is UCS.

21. The method of claim 19 wherein said fixed-length multiple-octet representation is UCS-2.

22. The method of claim 19 wherein said fixed-length multiple-octet representation is Unicode.

23. The method of claim 19 wherein said fixed-length multiple-octet representation is UCS-4.

24. The method of claim 19 wherein said pre-selected set of input characters comprises the C0, C1 and G0 set of characters in ISO/IEC 4873.

25. A system for transforming information between a fixed-length multiple-octet representation and a variable-length multiple-octet representation, comprising:

a first transform stage to transform information between said fixed-length multiple-octet representation and an intermediate variable-length multiple-octet representation, said first transform stage including a pre-defined set of characters which are represented as single octet values in said intermediate variable-length multiple octet representation; and a second transform stage to transform information between said intermediate representation and said variable-length multiple-octet representation, said second transform stage including means to maintain characters represented as single octets in either of said intermediate representation and said variable-length multiple-octet representation as single octets in the other of said intermediate representation and said variable-length multiple-octet representation.

26. The system of claim 25 wherein said fixed-length multiple-octet representation is UCS.

27. The system of claim 26 wherein said fixed-length multiple-octet representation is UCS-2.

28. The system of claim 26 wherein said fixed-length multiple-octet representation is Unicode.

29. The system of claim 26 wherein said fixed-length multiple-octet representation is UCS-4.

30. The system of claim 25 wherein said variable-length multiple-octet representation is an EBCDIC-friendly representation.

31. The system of claim 25 wherein said intermediate variable-length multiple-octet representation is an ASCII/ISO-8 bit-friendly representation.

32. The method of claim 30 wherein said EBCDIC-friendly representation is defined such that the value of the most significant octets of a majority of multi-octet EBCDIC-friendly characters are contiguous.

* * * * *